(12) United States Patent
Rhu et al.

(10) Patent No.: US 11,919,791 B2
(45) Date of Patent: Mar. 5, 2024

(54) PARTIAL NITRITATION USING SEQUENCING BATCH REACTOR WITH MEDIA INPUTTED THEREINTO, AND APPARATUS AND SYSTEM FOR SHORTCUT NITROGEN REMOVAL USING SAME

(71) Applicant: BKT CO., LTD., Daejeon (KR)

(72) Inventors: Daehwan Rhu, Gyeonggi-do (KR); Taeseok Oh, Daejeon (KR)

(73) Assignee: BKT CO., LTD., Daejeon (KR)

( * ) Notice: Subject to any disclaimer, the term of this patent is extended or adjusted under 35 U.S.C. 154(b) by 0 days.

(21) Appl. No.: 18/199,479

(22) Filed: May 19, 2023

(65) Prior Publication Data
US 2023/0286843 A1 Sep. 14, 2023

Related U.S. Application Data

(63) Continuation of application No. PCT/KR2021/014917, filed on Oct. 22, 2021.

(30) Foreign Application Priority Data

Nov. 20, 2020 (KR) .......................... 10-2020-0156809

(51) Int. Cl.
C02F 3/30 (2023.01)
C02F 101/16 (2006.01)

(52) U.S. Cl.
CPC .......... *C02F 3/307* (2013.01); *C02F 2101/16* (2013.01); *C02F 2203/006* (2013.01); *C02F 2209/06* (2013.01); *C02F 2209/22* (2013.01)

(58) Field of Classification Search
CPC .............................. C02F 3/307; C02F 2101/16; C02F 2203/006; C02F 2209/06; C02F 2209/22

USPC ....... 210/601, 609, 614, 615, 616, 617, 620, 210/259, 903
See application file for complete search history.

(56) References Cited

U.S. PATENT DOCUMENTS

| | | | | |
|---|---|---|---|---|
| 5,126,050 A | * | 6/1992 | Irvine | C02F 3/102 210/615 |
| 8,394,272 B2 | * | 3/2013 | Peng | C02F 3/1263 210/615 |
| 10,590,019 B2 | * | 3/2020 | Ertel | C02F 3/305 |

(Continued)

FOREIGN PATENT DOCUMENTS

KR 10-2005-0054645 A 6/2005
KR 10-2011-0027457 A 3/2011
(Continued)

OTHER PUBLICATIONS

Office Action issued by Korean Intellectual Property Office in priority application KR 10-2020-0156809, dated Jul. 1, 2021, pp. 1-4.

*Primary Examiner* — Fred Prince
(74) *Attorney, Agent, or Firm* — Dinsmore & Shohl LLP

(57) ABSTRACT

Disclosed are partial nitritation using a sequencing batch reaction tank with media inputted thereinto, and an apparatus and system for shortcut nitrogen removal using the same. According to one aspect of the present embodiment, a sequencing batch reaction tank operating apparatus and method capable of smoothly performing partial nitritation by adjusting the concentrations of free ammonia and free nitrous acid are provided.

13 Claims, 5 Drawing Sheets

(56) References Cited

U.S. PATENT DOCUMENTS

| | | | |
|---|---|---|---|
| 2008/0296220 A1* | 12/2008 | Fry | C02F 3/006 210/601 |
| 2010/0314311 A1* | 12/2010 | Peng | C02F 3/301 210/605 |
| 2014/0238931 A1* | 8/2014 | DiMassimo | C02F 3/1263 210/604 |
| 2019/0367399 A1* | 12/2019 | Jung | C02F 3/006 |

FOREIGN PATENT DOCUMENTS

| KR | 10-20113-0127459 A | 11/2013 |
|---|---|---|
| KR | 10-1830902 B1 | 3/2018 |
| KR | 2019-0134583 A | 12/2019 |

* cited by examiner

PARTIAL NITRITATION USING SEQUENCING BATCH REACTOR WITH MEDIA INPUTTED THEREINTO, AND APPARATUS AND SYSTEM FOR SHORTCUT NITROGEN REMOVAL USING SAME

CROSS-REFERENCE TO RELATED APPLICATIONS

This application is a continuation of International Application No. PCT/KR2021/014917 filed on Oct. 22, 2021, which claims priority to Korean Patent Application No. 10-2020-0156809 filed on Nov. 20, 2020, the entire contents of which are herein incorporated by reference.

The present patent is the result of a study conducted with the support of the Korea Environmental Industry and Technology Institute with financial resources from the Korean government (Ministry of Environment) in 2021 (Project Unique Number: 1485017574, Project Title: Promising Green Enterprise Technology Innovation Development Project)

TECHNICAL FIELD

The present disclosure relates to an apparatus for removing nitrogen in sewage/wastewater using a sequencing batch biofilm reactor (SBBR).

BACKGROUND ART

The contents described in this part merely provide background information on the present embodiment and do not constitute a conventional technology.

Contaminants present in sewage/wastewater include not only solids and organic matter, but also nutritive salts such as nitrogen and phosphorus, trace hazardous substances, etc.

Physical, chemical and biological methods are used as a method of removing these contaminants. Among these methods, the biological activated sludge method of removing contaminants using bacteria is most commonly used since it is superior in terms of economy and efficiency.

Sewage/wastewater from general households or business places contain various types of nitrogen, such as inorganic nitrogen such as ammonia, ammonium compounds, nitrite compounds, and nitrate compounds, and organic nitrogen such as amino acids and proteins.

Sewage/wastewater containing such nitrogen components causes eutrophication of water. In particular, since ammonia nitrogen has a high oxygen demand, it may cause a decrease of dissolved oxygen in the water body where nitrogen discharged in, causing death of fish and shellfish, and causing toxicity to aquatic animals. For this reason, discharges of nitrogen components into public water bodies are regulated so as to be minimized.

Most of the nitrogen components in sewage/wastewater exist as ammonia nitrogen. For this reason, conventionally, a treatment method combining a nitrification process of oxidizing ammonia nitrogen using oxygen and a denitrification process of denitrifying nitrified nitrogen using organic matter as an electron donor has been mainly used.

However, in the conventional nitrogen removal process, the power usage charge of the blower supplying oxygen in order to oxidize ammonia nitrogen to nitrate nitrogen accounts for 30 to 50% of the total sewage treatment plant operation costs. Because of this, oxygen supply becomes a major cause of operating cost increase. In addition, since a large amount of oxygen and organic matter are required in biological nitrogen removal, this also causes an increase in the operating costs.

A method developed to solve such a problem is a shortcut nitrogen removal process of oxidizing a part (57%) of ammonia nitrogen only to the nitrite nitrogen ($NO_2^-$—N) and then using the remaining (43%) ammonia nitrogen ($NH_4^+$—N) as an electron donor to remove nitrogen. This process can save oxygen by 60% and organic matter by 100% compared to the conventional nitrogen removal process.

A shortcut nitrogen removal process consists of a first step of oxidizing ammonia nitrogen to nitrite nitrogen and a second step of oxidizing ammonia nitrogen(anaerobic ammonium oxidation (ANAMMOX)) using the generated nitrite nitrogen from partial nitritation(PN). The anaerobic ammonium oxidation reaction is to oxidize ammonia nitrogen under anaerobic conditions and is performed as follows.

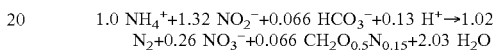

$1.0\ NH_4^+ + 1.32\ NO_2^- + 0.066\ HCO_3^- + 0.13\ H^+ \rightarrow 1.02\ N_2 + 0.26\ NO_3^- + 0.066\ CH_2O_{0.5}N_{0.15} + 2.03\ H_2O$ As can be confirmed from the above-described reaction formula, nitrite nitrogen is required as an electron acceptor to remove nitrogen. Accordingly, the shortcut nitrogen removal process should be preceded by a partial nitritation (PN) process in which a portion (57%) of ammonia nitrogen in sewage/wastewater is oxidized to nitrite nitrogen.

However, in the conventional shortcut nitrogen removal process, there has been a problem in that it is difficult to stably perform partial nitritation. It was difficult to continuously hold the generated ammonia-oxidizing bacteria (AOB) in a partial nitritation reactor. In addition, nitrite nitrogen ($NO_2$—N) always exists in the reaction tank. An environment suitable for the growth of nitrite-oxidizing bacteria (NOB) is always created so that nitrite-oxidizing bacteria (NOB) continuously grow and oxidize nitrite nitrogen to nitrate nitrogen, results in ruining partial nitritation.

Due to these problems, in the conventional shortcut nitrogen removal process, it was difficult to stably perform nitritation, and as a result, it was difficult to stably operate the process.

Disclosure

Technical Problem

An object of one embodiment of the present disclosure is to provide a nitrogen removing apparatus that can completely remove nitrogen in sewage/wastewater by inhibiting nitrite-oxidizing bacteria in the sequencing batch biofilm reactor and thus dominating the ammonia-oxidizing bacteria in the reaction tank.

Technical Solution

According to one aspect of the present disclosure, there is provided an apparatus for removing nitrogen in sewage/wastewater, the apparatus including a pretreatment unit for removing solids or organic matters in influent sewage/wastewater, a sludge treatment unit of thickening and digesting the solids removed from the pretreatment unit and separating them into a dewatered cake and a supernatant liquid, a sequencing batch biofilm reactor which receives sewage/wastewater that has passed through the pretreatment unit and adjusts the ratio of ammonia nitrogen and nitrite nitrogen in sewage/wastewater to a preset ratio, an anammox reaction tank which receives sewage/wastewater that has passed through the sequencing batch biofilm reactor and removes ammonia nitrogen and nitrite nitrogen in sewage/wastewater with nitrogen gas, and a control unit for controlling the sequencing batch biofilm reactor and performing controlling so that a supernatant liquid separated from the sludge treatment unit, not sewage/wastewater that has passed through the pretreatment unit, is flowed into the sequencing batch biofilm reactor if already set.

According to one aspect of the present disclosure, if already set, the concentration of nitrate nitrogen in the sequencing batch biofilm reactor has a preset concentration or more.

According to one aspect of the present disclosure, the supernatant liquid has a free ammonia (FA) concentration within a preset range.

According to one aspect of the present disclosure, the sequencing batch biofilm reactor discharges all of sewage/wastewater flowed in to the anammox reaction tank when the ratio of ammonia nitrogen and nitrite nitrogen in sewage/wastewater is adjusted to a preset ratio.

According to one aspect of the present disclosure, the sequencing batch biofilm reactor contains a media for oxidizing nitrogen components by being moved/fixed depending on the inflow of sewage/wastewater or a supernatant liquid into the sequencing batch biofilm reactor.

According to one aspect of the present disclosure, the media is a moving media that is up and down depending on the inflow of sewage/wastewater or a supernatant liquid, an packed-type media immersed in the lower part of the sequencing batch biofilm reactor, or a fixed-type fibrous media having a space for air supply in the middle.

According to one aspect of the present disclosure, the media implemented in the reactor are made of polypropylene (PP), polyethylene (PE), polystyrene (PS), or hydrogel in the case of the moving media, ceramic or clay in the case of the packed-type media, and polypropylene (PP), polyethylene (PE), polystyrene (PS), polytetrafluoroethylene (PTFE), or polyvinylidene fluoride or polyvinylidene difluoride (PVDF) in the case of the fixed-type fibrous media.

According to one aspect of the present disclosure, there is provided a sequencing batch biofilm reactor for adjusting the ratio of ammonia nitrogen and nitrite nitrogen in sewage/wastewater, the sequencing batch biofilm reactor including media, an ammonia nitrogen sensor, a nitrate nitrogen sensor, a pH sensor, a dissolved oxygen sensor, an outlet formed in the lowest of the sequencing batch biofilm reactor to discharge all of the sewage/wastewater flowed into the sequencing batch biofilm reactor to the outside, and an inlet formed in one side of the sequencing batch biofilm reactor to supply oxygen into the sequencing batch biofilm reactor.

Advantageous Effects

As described above, according to one aspect of the present disclosure, there is an advantage in that nitrogen in sewage/wastewater can be completely removed by inhibiting the nitrite-oxidizing bacteria in the sequencing batch biofilm reactor and thus dominating the ammonia-oxidizing bacteria in the reaction tank.

MODE FOR INVENTION

Figure 1:
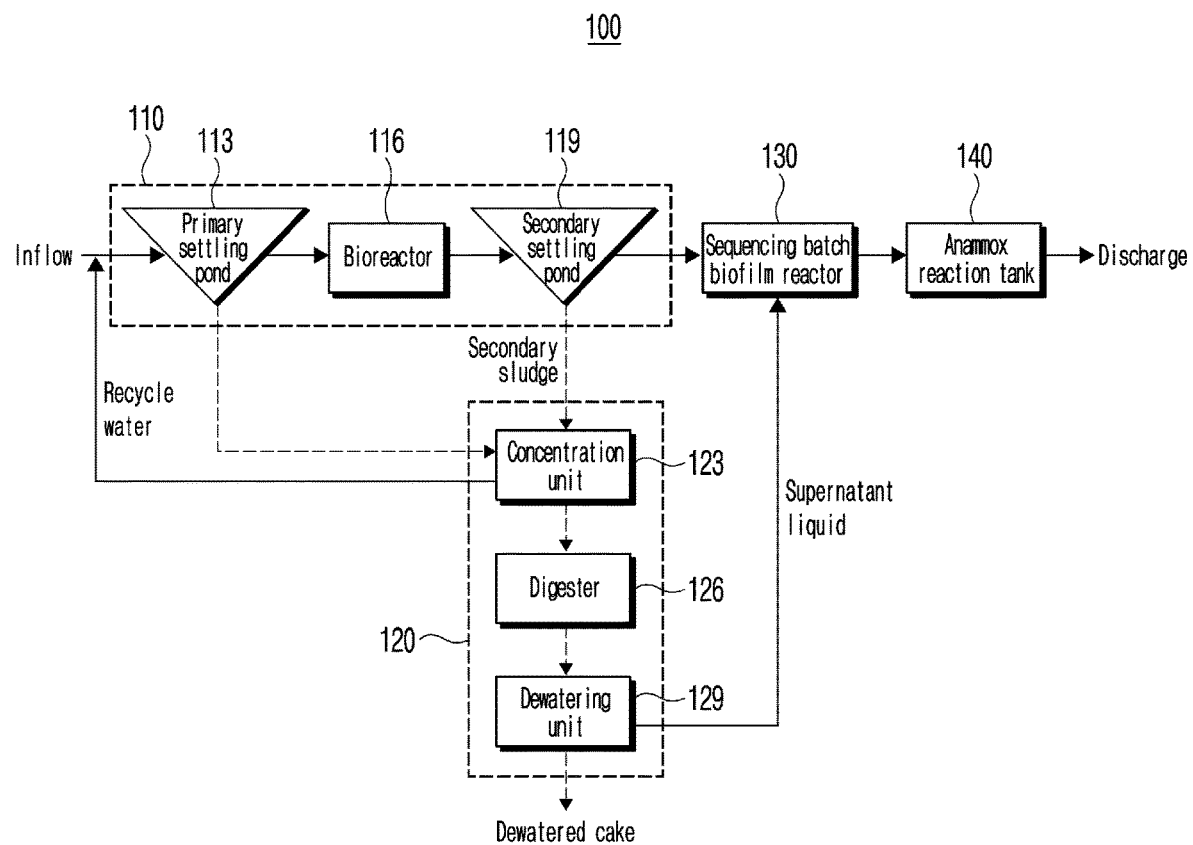
FIG. 1 is a view showing the configuration of an apparatus for removing nitrogen in sewage/wastewater according to one embodiment of the present disclosure.

Since the present disclosure can make various changes and have various embodiments, specific embodiments will be illustrated in the drawings and described in detail. However, this is not intended to limit the present disclosure to specific embodiments, and should be understood to include all modifications, equivalents, and substitutes included in the spirit and scope of the present disclosure. At the time of describing respective drawings, like reference numerals have been used for like components.

Terms, such as first, second, A, and B, can be used to describe various components, but the components should not be limited by the terms. The terms are used in order only to distinguish one component from another component. For example, the first component can be designated as the second component without departing from the scope of the present disclosure, and, similarly, the second component can also be designated as the first component. The term "and/or" includes a combination of a plurality of related listed items or any of the plurality of related listed items.

When a component is referred to as being "connected" or "coupled" to other component, it should be understood that it may be directly connected or coupled to the other component, but another component may be present in the middle therebetween. Meanwhile, when a component is referred to as being "directly connected" or "directly coupled" to other component, it should be understood that another component is not present in the middle therebetween.

The terms used in this application are only used to describe specific embodiments, and are not intended to limit the present disclosure. Singular expressions include plural expressions unless the context clearly dictates otherwise. It should be understood that the terms such as "comprise", "have", and the like in this application do not preclude the possibility of the presence or addition of features, numbers, steps, operations, components, parts, or combinations thereof described in the specification.

Unless defined otherwise, all terms used herein, including technical or scientific terms, have the same meaning as commonly understood by a person of ordinary skill in the art to which the present disclosure pertains.

Terms such as those defined in commonly used dictionaries should be interpreted as having a meaning consistent with the meaning in the context of the related art, and are not to be interpreted in an ideal or excessively formal meaning unless explicitly defined in the present application.

In addition, each configuration, procedure, process, method, or the like included in each embodiment of the present disclosure may be shared within a range in which the configurations, procedures, processes, methods, or the like do not contradict each other technically.

FIG. 1 is a view showing the configuration of an apparatus for removing nitrogen in sewage/wastewater according to one embodiment of the present disclosure.

Referring to FIG. 1, a nitrogen removing apparatus 100 according to one embodiment of the present disclosure includes a pretreatment unit 110, a sludge treatment unit 120, a sequencing batch biofilm reactor 130 (SBBR: abbreviated as 'reactor' hereinafter), an anammox reaction tank 140, and a control unit (not shown). The nitrogen removing apparatus 100 may be implemented as one apparatus and include the above-described components, or each of the above-described components may be implemented as one device or process.

The pretreatment unit 110 receives sewage/wastewater from the outside and removes solids or organic matters that are not required for nitrogen removal from the reactor 130 and the anammox reaction tank 140. The pretreatment unit 110 is located ahead of the reactor 130 in the order of sewage/wastewater treatment and receives sewage/wastewater flowing in from the outside prior to the reactor 130. The pretreatment unit 110 removes solids or organic matters from sewage/wastewater that have been flowed in. The pretreatment unit 110 includes a primary settling tank 113, a bioreactor 116, and a secondary settling tank 119.

The primary settling tank 113 removes solids from influent sewage/wastewater. The primary settling tank 113 receives sewage/wastewater and separates them into primary sludge and supernatant water. Soil and solids having a large particle size may be contained in the primary sludge, and the primary settling tank 113 removes them. The primary sludge separated from the primary settling tank is discharged to the sludge treatment unit 120, and supernatant water is discharged to the bioreactor 116.

The bioreactor 116 contains microorganisms that oxidize organic matters and remove organic matters from influent sewage/wastewater.

The secondary settling tank 119 separates sludge from sewage/wastewater that has passed through the bioreactor 116. Additionally, the secondary settling tank 119 receives sewage/wastewater and separates secondary sludge and supernatant water. Since sewage/wastewater has passed through the primary settling tank 113, the particle size of the secondary sludge separated in the secondary settling tank 119 is relatively smaller than that of the primary sludge. The secondary settling tank 119 discharges secondary sludge to the sludge treatment unit 120 and discharges supernatant water to the reactor 130.

The sludge treatment unit 120 treats the sludge separated from the pretreatment unit 110. The sludge treatment unit 120 includes a thickening unit 123, a digester 126 and a dewatering unit 129.

The thickening unit 123 concentrates each sludge flowed from the primary settling tank 113 and the secondary settling tank 119. Primary sludge from the primary settling tank 113 and secondary sludge from the secondary settling tank 119 are flowed into the thickening unit 123. Since the amount of sludge flowed is significant, considerable difficulties may exist in treating it unless the volume is reduced. To solve this problem, the thickening unit 123 reduces the volume of the sludge by concentrating each influent sludge. After the sludge is thickened in the thickening unit 123, the thickened sludge is discharged to the digester 126, and supernatant water is returned to the primary settling tank 113. Organic matters or microorganisms may be contained in supernatant water. In order to completely remove the organic matter or to improve the organic matter removal efficiency of the bioreactor 116, the thickening unit 123 returns supernatant water to the primary settling tank 113.

The digester 126 breaks the sludge thickened by the thickening unit 123. Digestion of sludge is performed in the digester 126, and the digested sludge is concentrated to the bottom of the digester 126. At this time, the pH of liquid in the digester 126 in the digestion process is 8 or more. As shown in the equation below, as the pH increases, the concentration of free ammonia (FA) increases.

$$FA(mgN/L) = \frac{NH_4 - N(mg\ N/L) \times (10^{pH})}{\frac{K_b}{K_\omega} + 10^{pH}}$$

$$\frac{K_b}{K_\omega} = e^{\left(\frac{6344}{273+T(^\circ C.)}\right)}$$

Here, $K_w$ means the ionization constant of water, and $K_b$ means the ionization constant of an aqueous ammonia solution. Referring to the above-described equation, it can be confirmed that the concentration of free ammonia increases as the pH increases and the temperature of sewage/wastewater increases. Accordingly, as the pH of liquid in the digester 126 increases, the concentration of free ammonia also increases.

The increasing concentration of free ammonia can lead to the effects as follows. When the concentration of free ammonia is 10 mg/L or more, both anabolism and catabolism of nitrite-oxidizing bacteria (NOB) are inhibited. Meanwhile, in the case of ammonia-oxidizing bacteria (AOB), the anabolism and catabolism begin to be inhibited little by little when the concentration of free ammonia is 20 mg/L or more, and both actions are significantly inhibited when the concentration of free ammonia is 150 mg/L or more. As such, the nitrite-oxidizing bacteria and ammonia-oxidizing bacteria have different characteristics in their activities with respect to the concentration of free ammonia. Accordingly, it can be seen that, when the concentration of free ammonia is 10 to 150 mg/L, particularly, when the concentration is 10 to 20 mg/L, the activity of ammonia-oxidizing bacteria is barely inhibited, whereas the activity of the nitrite-oxidizing bacteria is significantly inhibited.

Thus, the digestion effluent in the digester 126 has a relatively considerably high concentration of free ammonia compared to sewage/wastewater that has passed through the pretreatment unit 110.

The sludge digested in the digester 126 flows into the dewatering unit 129.

The dewatering unit 129 receives the digestion effluent and separates it into a dewatered cake and a supernatant liquid. As mentioned above, the supernatant liquid contains a fairly high level of free ammonia. The supernatant liquid in the dewatering unit 129 flows into the reactor 130 according to the control of the control unit (not shown).

The reactor 130 receives sewage/wastewater that has passed through the pretreatment unit 110 and adjusts the ratio of ammonia nitrogen and nitrite nitrogen in sewage/wastewater to a preset ratio. In addition, the reactor 130 receives the supernatant liquid from the sludge treatment unit 120 and maintains an environment in which the ratio of ammonia nitrogen and nitrite nitrogen in supernatant liquid can be adjusted to the preset ratio.

Figure 2:
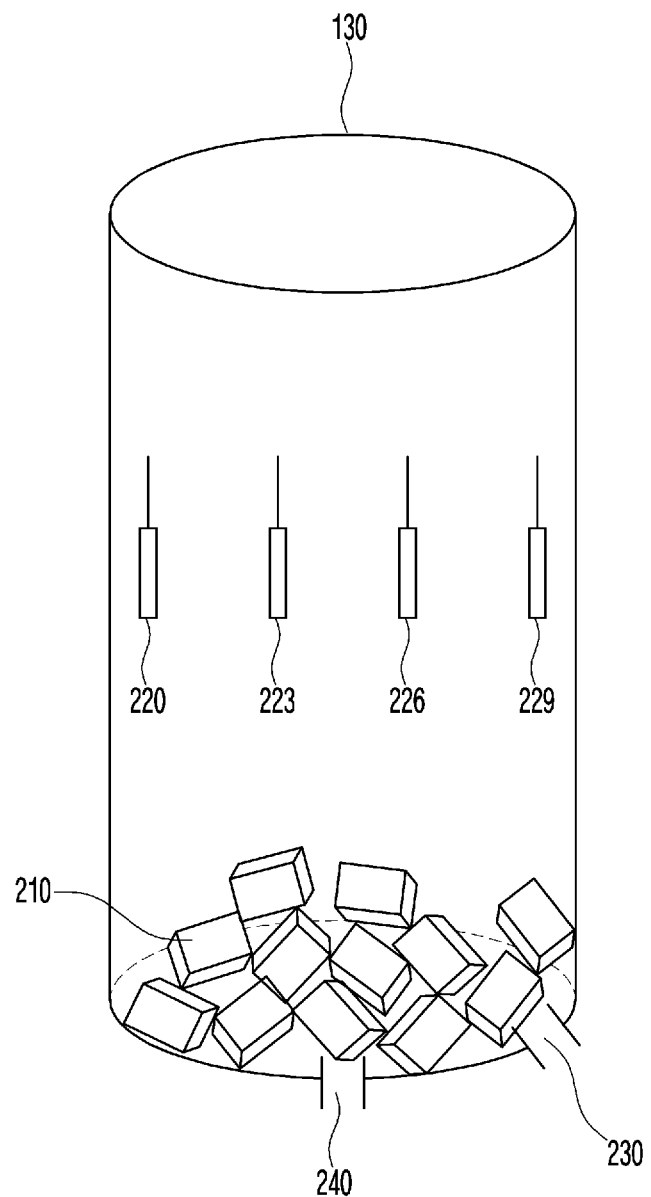
FIG. 2 is a view showing a sequencing batch biofilm reactor according to one embodiment of the present disclosure.

The reactor 130 has a structure shown in FIG. 2.

FIG. 2 is a view showing a sequencing batch biofilm reactor according to one embodiment of the present disclosure.

Referring to FIG. 2, the reactor 130 according to one embodiment of the present disclosure includes media 210, an ammonia nitrogen sensor 220, a nitrate nitrogen sensor 223, a pH sensor 226, a dissolved oxygen sensor 229, an outlet 230, and an inlet 240.

The media 210 oxidizes the nitrogen component in influent sewage/wastewater or supernatant liquid. The media 210 provides a structure or environment to which microorganisms are attached to grow, or which can immobilize a large amount of microorganisms in advance. The media 210 allows microorganisms to attach to themselves and grow (or proliferate), and prevents microorganisms from being washout together with the discharge of sewage/wastewater or supernatant liquid even when sewage/wastewater or supernatant liquid is discharged from the reactor 130. Since ammonia-oxidizing bacteria are mainly selectively immobilized or attached to the media 210 to grow, the number (or concentration) of microorganisms does not change significantly even when sewage/wastewater or supernatant liquid is discharged. Meanwhile, the nitrite-oxidizing bacteria mainly grow in sewage/wastewater or supernatant liquid, and only some of them are attached to the media 210 and grow. Accordingly, the number (or concentration) of the nitrite-oxidizing bacteria greatly is decreased when sewage/wastewater or supernatant liquid is discharged.

The media 210 may be implemented as a moving media having a specific gravity similar to or smaller than that of water so that it is up or down, or has a processed state depending on the inflow of sewage/wastewater or supernatant liquid. The media may be implemented as an packed-type media immersed in the lower part of the reactor, and it may also be implemented as a fixed-type fibrous media having a space for air supply in the middle. When it is implemented as moving media, the media 210 may be implemented with polypropylene (PP), polyethylene (PE), polystyrene (PS), or hydrogel. At this time, the hydrogel may immobilize the ammonia-oxidizing bacteria using polyethylene glycol diacrylate or polyvinyl chloride (PVC). When it is implemented as the packed-type media, the media 210 may be implemented with ceramic and/or clay. When it is implemented as the fixed-type fibrous media, the media 210 may be implemented with polypropylene (PP), polyethylene (PE), polystyrene (PS), polytetrafluoroethylene (PTFE), or polyvinylidene fluoride or polyvinylidene difluoride (PVDF). When the media 210 is implemented as the fixed-type fibrous media, its surface becomes hydrophobic.

The ammonia nitrogen sensor 220 measures the concentration of ammonia nitrogen in the reactor 130. The ammonia nitrogen sensor 220 measures the concentration of ammonia nitrogen so that a control unit (not shown) can determine when to initiate or stop oxidation of ammonia nitrogen, and calculate the concentration of free ammonia in the reactor.

The nitrate nitrogen sensor 223 measures the concentration of nitrate nitrogen in the reactor 130. The nitrate nitrogen sensor 223 measures the concentration of nitrate nitrogen so that the control unit (not shown) can determine when to stop the inflow of sewage/wastewater passing through the pretreatment unit 110 into the reactor and allow the supernatant liquid discharged from the sludge treatment unit 120 to flow in.

The pH sensor 226 measures the pH in the reactor 130. The pH sensor 226 measures the pH so that the control unit (not shown) can calculate the concentration of free ammonia and free nitrous acid in the reactor, and adjust the degree of oxidation of ammonia nitrogen in the reactor into nitrite nitrogen.

The dissolved oxygen sensor 229 measures the amount of dissolved oxygen in the reactor 130. The dissolved oxygen sensor 229 measures the amount of oxygen so that the control unit (not shown) can determine whether or not oxygen is appropriately supplied to the reactor.

The outlet 230 allows sewage/wastewater or supernatant liquid flowed into the inside to be discharged to the outside. The outlet 230 is located at the lowest of the reactor 130 and discharges all of the sewage/wastewater or supernatant liquid flowed into the reactor. A screen (not shown) having holes smaller than the media 210 is installed in the outlet 230 to prevent the media 210 from being washout.

The outlet 230 discharges the entire of the sewage/wastewater or supernatant liquid without being remained in the reactor 130 except for sewage/wastewater or supernatant liquid that cannot be structurally (naturally) discharged from the inside of the reactor 130. The reactor 130 adjusts the concentration of ammonia nitrogen and the concentration of nitrite nitrogen to have a preset ratio. Here, the concentration of ammonia nitrogen and the concentration of nitrite nitrogen may be set to have a ratio of 1:1.32, respectively. When the concentration of ammonia nitrogen and the concentration of nitrite nitrogen are at the above-described ratio, nitrogen components can be degassed into nitrogen gas by anammox microorganisms in the anammox reaction tank 140 without consuming additional organic matter or oxygen. At this time, since nitrite nitrogen is oxidized to nitrate nitrogen when the number (or concentration) of nitrite-oxidizing bacteria increases, the number of the nitrite-oxidizing bacteria should be reduced (minimized). As the entire amount of sewage/wastewater is discharged by the outlet 230, sewage/wastewater does not remain in the reactor 130. Conventionally, even if the (moving) media was not contained in the reactor 130, or even if it was contained, sewage/wastewater flowed was discharged while leaving it in a certain amount of volume in order to prevent microorganisms from being washout. In addition, due to the remaining sewage/wastewater, even if new sewage/wastewater flows into the reactor, the concentration of ammonia nitrogen is diluted so that there is a problem in that it does not have a sufficient concentration, and nitrite-oxidizing bacteria proliferate at a rapid rate by nitrite nitrogen in the remaining sewage/wastewater so that there is a problem in that nitrite nitrogen is oxidized continuously. When the concentration of ammonia nitrogen is diluted, and nitrite nitrogen is oxidized to nitrate nitrogen, ammonia nitrogen and nitrite nitrogen do not have a preset ratio so that the anammox reaction does not occur in the anammox reaction tank 140. In order to prevent such problems, the reactor 130 discharges the entire of the sewage/wastewater flowed in. As the entire of the sewage/wastewater is discharged, the concentration of ammonia nitrogen is not diluted since sewage/wastewater does not remain in the reactor 130, and nitrite-oxidizing bacteria can hardly proliferate since nitrite nitrogen is insufficient or almost nonexistent. Thus, the reactor 130 can prevent the proliferation of nitrite-oxidizing bacteria.

The inlet 240 supplies oxygen into the reactor 130. For the proliferation and operation of the ammonia-oxidizing bacteria in the reactor 130, oxygen, which is an oxidizer for oxidizing ammonia nitrogen, should be supplied. The reactor 130 includes an inlet 240 on the bottom surface thereof, through which only air bubbles (oxygen) can flow into the reactor 130, so that oxygen is received into the reactor 130. Most of oxygen flowed into the inside thereof is used for oxidation of ammonia nitrogen.

Figure 3A:
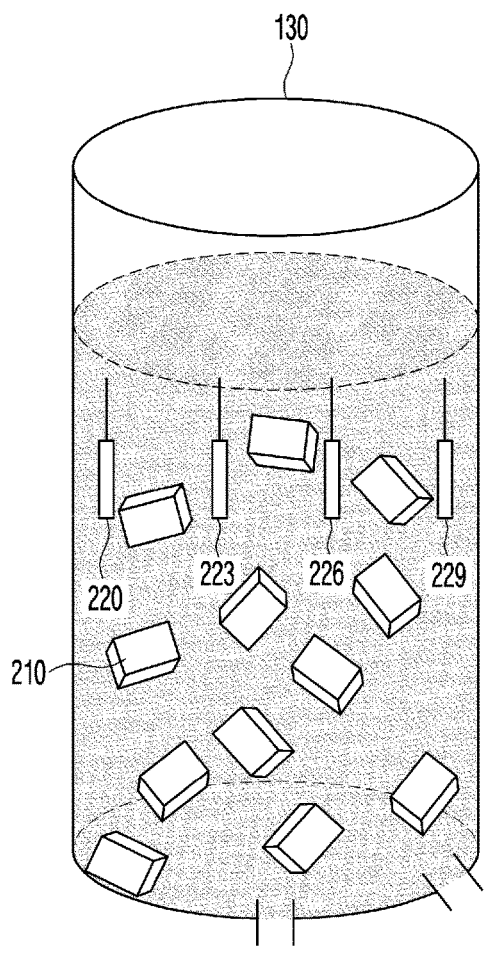
FIGS. 3A and 3B are views showing the operation appearance of a sequencing batch biofilm reactor into which a moving media is inputted according to one embodiment of the present disclosure.
Figure 3B:
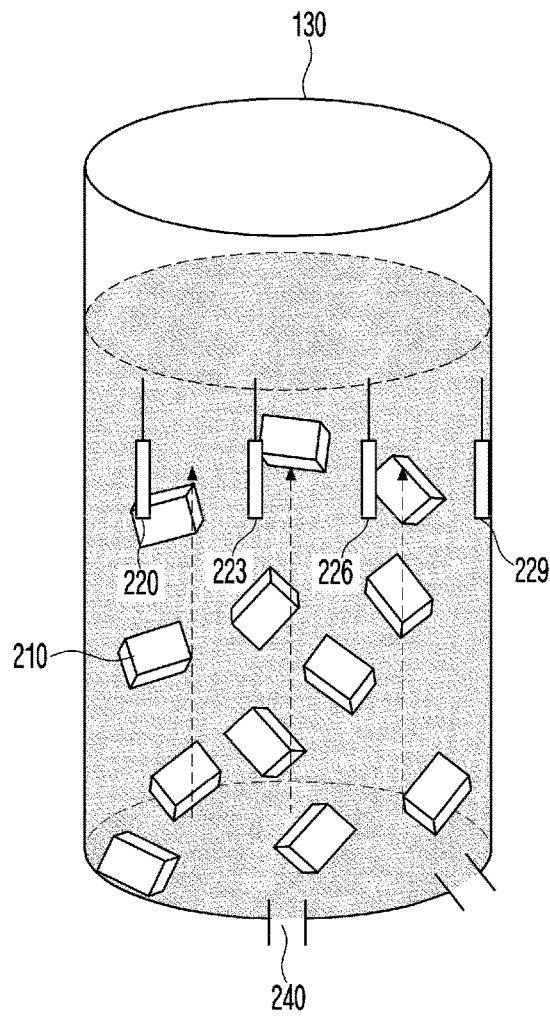

The aforementioned reactor 130 operates as shown in FIGS. 3A and 3B.

FIGS. 3A and 3B are views showing the operation appearance of a sequencing batch biofilm reactor into which a moving media is inputted according to one embodiment of the present disclosure.

As shown in FIG. 3A, sewage/wastewater or a supernatant liquid is flowed into the reactor 130 from which the entire of the sewage/wastewater or the supernatant liquid is discharged. Accordingly, the media 210 is moved together with the rise of the water level.

Thereafter, as shown in FIG. 3B, oxygen is injected into the reactor 130, and oxidation of ammonia nitrogen proceeds. When the concentrations of ammonia nitrogen and nitrite nitrogen have a preset ratio, the injection of oxygen is stopped, and sewage/wastewater flowed into is discharged into the anammox reaction tank 140. Meanwhile, if a supernatant liquid rather than sewage/wastewater has been flowed into the reactor 130, oxygen is injected for a preset period (12 to 24 hours). While air is also additionally injected after oxygen has been injected, ammonia nitrogen is converted into nitrite nitrogen, and when the concentration of nitrite nitrogen has a preset ratio, it is discharged to the outside of the anammox reaction tank 140.

Since the media 210 is contained in the reactor 130 and is not discharged to the outlet 230, microorganisms attached to the media 210 are not completely discharged even if sewage/wastewater or the supernatant liquid is completely discharged. Accordingly, the reactor 130 may perform a discharge process immediately after performing the reaction by injecting oxygen without the need for additionally passing through the settling process like a conventional sequencing batch reactor (SBR). Although it depends on the characteristics of sewage/wastewater, sewage/wastewater is usually flowed into the reactor 130 to perform a reaction with oxygen, and it takes 1 to 4 hours for sewage/wastewater to be discharged after stopping.

Referring back to FIG. 1, the anammox reaction tank 140 receives sewage/wastewater that has passed through the reactor 130 and removes nitrogen in sewage/wastewater. The anammox reaction tank 140 induces an anammox reaction by containing anammox microorganisms therein. The anammox reaction corresponds to a reaction in which anammox microorganisms oxidize ammonia nitrogen with nitrite nitrogen under anaerobic conditions (anoxic conditions). Thus, ammonia nitrogen is degassed into nitrogen gas, and nitrogen in sewage/wastewater is removed. The anammox reaction is as follows.

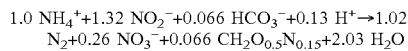

$$1.0\ NH_4^+ + 1.32\ NO_2^- + 0.066\ HCO_3^- + 0.13\ H^+ \rightarrow 1.02\ N_2 + 0.26\ NO_3^- + 0.066\ CH_2O_{0.5}N_{0.15} + 2.03\ H_2O$$

Anammox microorganisms degas nitrogen without consuming additional organic matter or oxygen. The anammox reaction tank 140 discharges them after removing nitrogen.

A control unit (not shown) controls the operation of the reactor 130.

When sewage/wastewater flows into the reactor 130, the control unit (not shown) injects oxygen until the concentration of ammonia nitrogen and the concentration of nitrite nitrogen reach a preset ratio. When sewage/wastewater flows into the reactor 130, the control unit (not shown) controls the inlet 240 so that oxygen is flown in. The control unit (not shown) determines whether or not an appropriate amount (e.g., 1 to 5 mg/L) of oxygen is flowing in based on the sensed value of the dissolved oxygen sensor 229, and controls the flow of oxygen so that it flows into the reactor 130 in an appropriate amount. When oxygen is provided through the inlet 240, ammonia nitrogen is oxidized to nitrite nitrogen by the operation of the ammonia-oxidizing bacteria. At this time, the control unit (not shown) detects the concentration of ammonia nitrogen in sewage/wastewater based on the sensed value of the ammonia nitrogen sensor 220. When the concentration of ammonia nitrogen in sewage/wastewater after oxygen injection corresponds to 43% of the concentration of ammonia nitrogen in sewage/wastewater at the time of initial inflow, the control unit (not shown) stops oxygen injection. The fact that the concentration of ammonia nitrogen in sewage/wastewater after oxygen injection corresponds to 43% of the concentration of ammonia nitrogen in sewage/wastewater at the time of initial inflow means that 57% of ammonia nitrogen has been oxidized to nitrite nitrogen. Since this is a numerical value that satisfies the preset ratio of 1:1.32 (concentration of ammonia nitrogen: concentration of nitrite nitrogen), the control unit (not shown) controls the inlet 240 so that the injection of oxygen is stopped, and controls the outlet 230 so that sewage/wastewater is discharged to the anammox reaction tank 140.

Meanwhile, when the concentration of nitrate nitrogen in the reactor 130 is a preset numerical value or more, the control unit (not shown) blocks the injection of sewage/wastewater that has passed through the pretreatment unit 110, and then allows the supernatant liquid from the sludge treatment unit 120 to flow in. After ammonia nitrogen is oxidized by a preset ratio, the control unit (not shown) analyzes the concentration of nitrate nitrogen in sewage/wastewater after the reaction is completed from the nitrate nitrogen sensor 223. The concentration of nitrate nitrogen represents the number (or concentration) of nitrite-oxidizing bacteria present in the reactor 130. Nitrite-oxidizing bacteria are not necessary for the anammox reaction, and when the number of nitrite-oxidizing bacteria increases, nitrite-oxidizing bacteria also prevent nitrite nitrogen from being present as much as a certain proportion of ammonia nitrogen. Therefore, it is necessary to remove nitrite-oxidizing bacteria or inhibit their activation. Accordingly, when the concentration of nitrate nitrogen is a preset numerical value (for example, 10% of the concentration of ammonia nitrogen in sewage/wastewater at the time of initial inflow) or more, the control unit (not shown) blocks the injection of sewage/wastewater that has passed through the pretreatment unit 110, and then allows the supernatant liquid from the sludge treatment unit 120 to flow in. As described above, the supernatant liquid in the sludge treatment unit 120 contains a significantly high concentration of free ammonia, and the activity of nitrite-oxidizing bacteria is significantly inhibited in sewage/wastewater having a free ammonia concentration of 10 mg/L or more.

The control unit (not shown) flows the supernatant liquid in the sludge treatment unit 120 into the reactor 130, and then adjusts the concentration of free ammonia to satisfy the preset range. As described above, the concentration of free ammonia can be calculated if the concentration of ammonia nitrogen and pH information are available. The control unit (not shown) receives the above-described information from the ammonia nitrogen sensor 220 and the pH sensor 226 in the reactor 130 and calculates the concentration of free ammonia and free nitrous acid in the reactor. The control unit (not shown) determines whether or not the calculated result satisfies preset range. Here, the preset range may be 10 to 150 mg/L, preferably 10 to 20 mg/L. When the concentration of free ammonia is excessively high, the activities of not only nitrite-oxidizing bacteria but also ammonia-oxidizing bacteria are inhibited. In order to prevent this, the control unit (not shown) determines whether or not the concentration of free ammonia in the flowed-in supernatant liquid is within a preset range. When the concentration of free ammonia does not satisfy the preset range, the control unit (not shown) dilutes the concentration of ammonia nitrogen (inflow of low-concentration sewage/wastewater, etc.) or reduces the pH in the supernatant liquid (injecting an acid agent, etc.). As a supernatant liquid having a concentration of free ammonia within a predetermined range is injected into the reactor 130, the activity of nitrite-oxidizing bacteria remaining in the reactor 130 is significantly inhibited by free ammonia. When sewage/wastewater is flowed into the reactor 130 again after injection of the supernatant liquid, only oxidation to nitrite nitrogen may be smoothly performed while oxidation to nitrate nitrogen is minimized.

The control unit (not shown) may perform the above-described control based on the sensed value of the concentration of nitrate nitrogen, but is not necessarily limited thereto. If the amount of sewage/wastewater flowing into the reactor 130 is constant, when sewage/wastewater generally flows in a certain number of times, the concentration of nitrate nitrogen (nitrite-oxidizing bacteria) becomes a preset numerical value or more. Using this, the control unit (not shown) may inject the supernatant liquid instead of sewage/wastewater into the reactor 130 at regular intervals without sensing the concentration of nitrate nitrogen. The control unit (not shown) may maintain the concentration of nitrite-oxidizing bacteria in the reactor 130 at a preset numerical value or less by periodically injecting the supernatant liquid.

Although FIG. 1 shows that the reactor 130 and the anammox reaction tank 140 are provided one by one in the nitrogen removing apparatus 100, it is not necessarily limited thereto. A plurality of reactors 130 and a plurality of anammox reaction tanks 140 in the nitrogen removing apparatus 100 may be respectively implemented. Sewage/wastewater (that has passed through the pretreatment unit 110) may be flowed into each reactor 130 and anammox reaction tank 140, or a supernatant liquid (in the sludge treatment unit 120) may be injected thereinto. At this time, since the reactor 130 into which the supernatant liquid is injected cannot perform removal of nitrogen in sewage/wastewater, the supernatant liquid may be allowed to be alternately injected into each reactor 130. For example, when three reactors 130 and an anammox reaction tank 140 are included in the nitrogen removing apparatus 100, the control unit (not shown) allows sewage/wastewater to be injected into the remaining reactors in a situation where the supernatant liquid is injected into any one reactor. Accordingly, a certain amount of sewage/wastewater can be steadily treated by the nitrogen removing apparatus 100.

Figure 4:
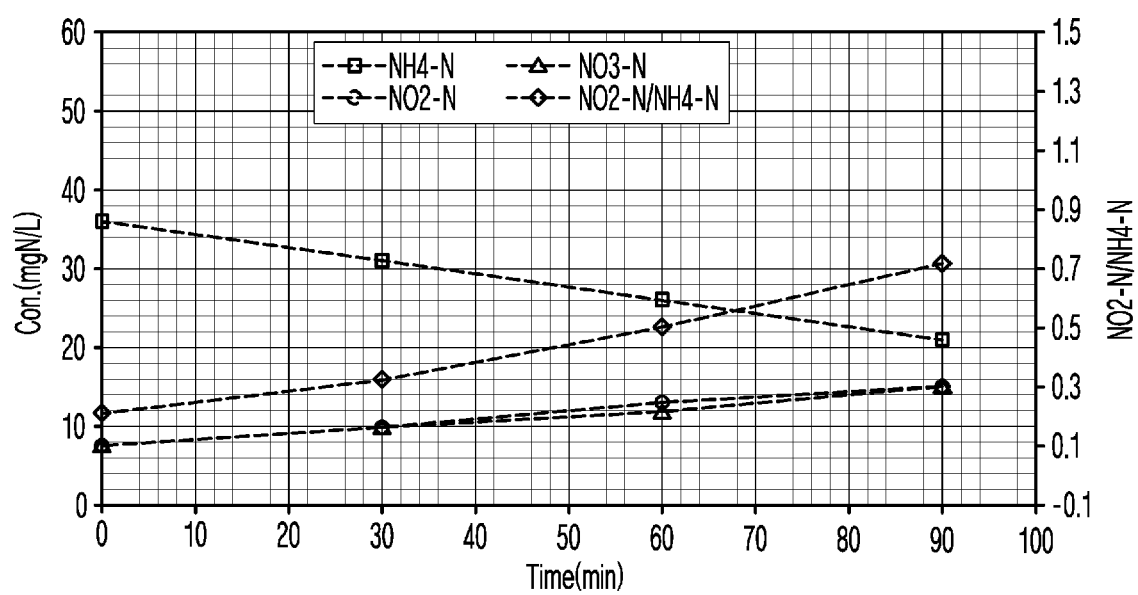
FIG. 4 is a graph showing changes in nitrogen concentration in a conventional partial nitritation apparatus.

FIG. 4 is a graph showing changes in nitrogen concentration in a conventional partial nitritation apparatus.

The graph of FIG. 4 is a graph when a conventional partial nitritation apparatus is operated by the operating method according to one embodiment of the present disclosure. The total reactor volume is 10 L, and raw water (sewage/wastewater) was flowed in up to 70% of the entire reactor. The volume of the injected moving media was 5 L, which was 70% of the total reaction volume. Raw water was prepared and used similarly to secondary treated water at a sewage disposal plant using chemicals. The properties of raw water included an ammonia nitrogen concentration of 51.0 mg/L, a pH of 8.0, and an alkalinity of 357 mg/L. Raw water was flowed into the conventional partial nitritation reactor for 4 days, and it was operated in inflow/reaction for 90 minutes and discharge for 10 minutes. After 4 days have been elapsed since the operation was performed by injecting raw water, air and supernatant liquid form sludge treatment unit having an ammonia nitrogen concentration of 700 mg/L, a pH of 8.0, and an alkalinity of 2,500 mg/L were injected for 1 day for inhibition. The initial free ammonia concentration was about 50 mg/L, and it was made to become a condition in which nitrite-oxidizing bacteria (NOB) were inhibited. However, unlike one embodiment of the present disclosure, only 50% rather than the entire amount of the volume flowed into the reactor was discharged after the reaction was completed. Dissolved oxygen was maintained at 2.0 to 3.5 mg/L, and the temperature was maintained at 25° C.

When the conventional partial nitritation apparatus was operated as described above, a certain amount of nitrite nitrogen was produced as in the graph shown in FIG. 4. However, since nitrite nitrogen as well as ammonia nitrogen always remains in the reactor, it can be confirmed that the number (or concentration) of not only ammonia-oxidizing bacteria (AOB) but also nitrite-oxidizing bacteria (NOB) continuously grows, resulting in continuous production of nitrate nitrogen. It could be confirmed that the concentration ratio of ammonia nitrogen and nitrite nitrogen after the treatment was only so that it was maintained lower than 1.32, which is the ratio required for the anammox reaction in the anammox reaction tank. Accordingly, it could be confirmed that it is difficult to stably remove nitrogen in sewage/wastewater with the conventional partial nitritation apparatus. In addition, it was shown that the nitrate nitrogen concentration was also shown to be high as 15 mg/L so that it was impossible to maintain the nitrogen concentration in the final effluent at 10 mg/L or less.

Figure 5:
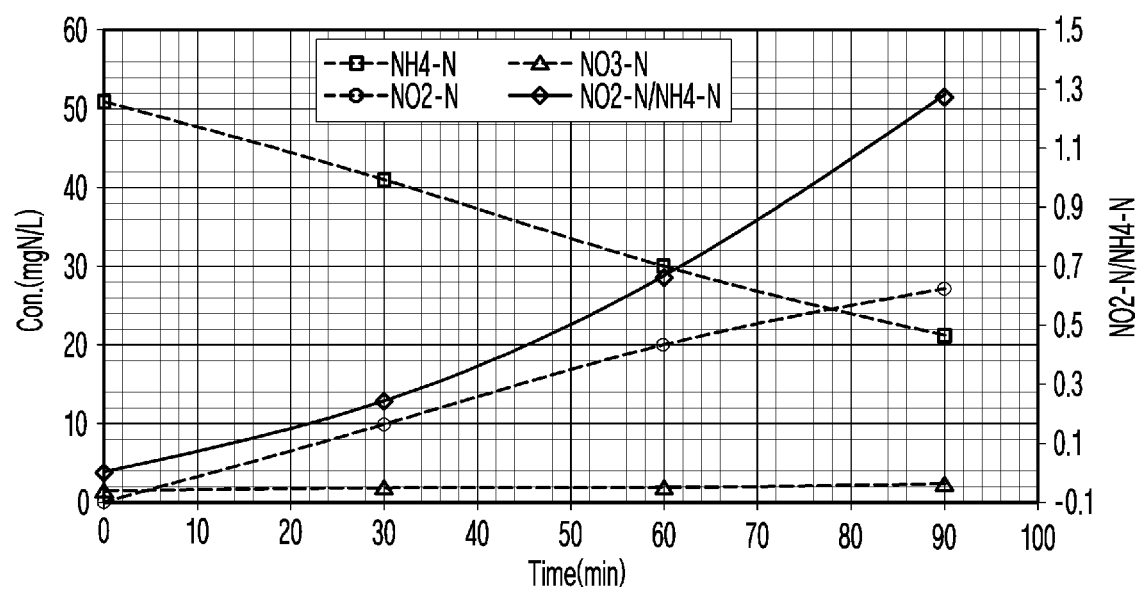
FIG. 5 is a graph showing changes in nitrogen concentration in a partial nitritation apparatus according to one embodiment of the present disclosure.

FIG. 5 is a graph showing changes in nitrogen concentration in a nitrogen removing apparatus according to one embodiment of the present disclosure.

The reactor according to one embodiment of the present disclosure was operated by applying in a similar manner as in the above-described operation method. The total reactor volume is 10 L, and raw water (sewage/wastewater) was flown in up to 70% of the entire reactor. The volume of the injected filter media was 5 L, which was 70% of the total reaction volume. Raw water was prepared and used similarly to secondary treated water at a sewage disposal plant using chemicals. The properties of raw water included an ammonia nitrogen concentration of 51.0 mg/L, a pH of 8.0, and an alkalinity of 357 mg/L. Raw water was flown into the reactor for 6 days, and the reactor was operated with inflow/reaction 90 minutes and discharge 10 minutes. After 16 days have been elapsed since the operation was performed by injecting raw water, air and supernatant from sludge treatment unit having an ammonia nitrogen concentration of 700 mg/L, a pH of 8.0, and an alkalinity of 2,500 mg/L were injected for 1 day for inhibition. The initial free ammonia concentration was about 50 mg/L, and it was made to become a condition in which nitrite-oxidizing bacteria (NOB) were inhibited. However, unlike the conventional art, the entire of wastewater flowed into the reactor was discharged after the reaction was completed. Dissolved oxygen was maintained at 2.0 to 3.5 mg/L, and the temperature was maintained at 25° C.

The operation result of the reactor according to one embodiment of the present disclosure is shown in FIG. 5. After the reaction, the concentration of nitrate nitrogen increased only by 0.9 mg/L, and the concentration of nitrite nitrogen increased by 27 mg/L so that it could be confirmed that the concentration ratio of ammonia nitrogen to nitrite nitrogen was 1.3. It could be confirmed that the reactor according to one embodiment of the present disclosure satisfies the ratio required for the anammox reaction in the anammox reaction tank 140 at the rear of the reactor. As a result, it could be confirmed that the partial nitritation apparatus according to one embodiment of the present disclosure can effectively inhibit nitrite-oxidizing bacteria and thus can stably achieve nitritation for nitrogen removal using the anammox reaction.

The above description is merely illustrative of the technical idea of the present embodiment, and various modifications and changes can be made by those of ordinary skill in the art to which the present embodiment pertains, without departing from the essential characteristics of the present embodiment. Accordingly, the embodiments are not for limiting, but for explaining the technical spirit of the present embodiment, and the scope of the technical idea of the present embodiment is not limited by such embodiments. The protection scope of the present embodiment should be construed based on the following claims, and all technical ideas within the scope equivalent thereto should be construed as being included in the scope of the present embodiment.

The invention claimed is:

1. An apparatus for removing nitrogen in sewage and/or wastewater, the apparatus comprising:
    a pretreatment unit for removing solids or organic matters in influent sewage and/or wastewater;
    a sludge treatment unit for receiving, thickening, and digesting the solids removed in the pretreatment unit to separate them into a dewatered cake and a supernatant liquid;
    a sequencing batch biofilm reactor which receives sewage and/or wastewater that has passed through the pretreatment unit and adjusts a ratio of ammonia nitrogen and nitrite nitrogen in sewage and/or wastewater to a preset ratio;
    an anammox reaction tank which receives sewage and/or wastewater that has passed through the sequencing batch biofilm reactor and removes ammonia nitrogen and nitrite nitrogen in sewage and/or wastewater with nitrogen gas; and
    a control unit for controlling the sequencing batch biofilm reactor and performing controlling so that a supernatant liquid separated from the sludge treatment unit, not sewage and/or wastewater that has passed through the pretreatment unit, is flowed into the sequencing batch biofilm reactor when a concentration of nitrate nitrogen in the sequencing batch biofilm reactor is a preset concentration or more,
    wherein the pretreatment unit removes solids or organic matters that are not required for nitrogen removal in the sequencing batch biofilm reactor and the anammox reaction tank,
    the sequencing batch biofilm reactor discharges the entire amount of sewage and/or wastewater in the sequencing batch biofilm reactor to the anammox reaction tank when the concentrations of ammonia nitrogen and nitrite nitrogen in the flowed-in sewage and/or wastewater have a preset ratio, and
    the sequencing batch biofilm reactor includes a carrier that allows ammonia-oxidizing bacteria to be selectively immobilized or attached to grow, and prevents the carrier from being discharged when the sewage and/or wastewater or supernatant liquid flowing into the inside of the sequencing batch biofilm reactor is discharged to the outside of the sequencing batch biofilm reactor.

2. The apparatus of claim 1, wherein the supernatant liquid has a free ammonia (FA) concentration within a preset range.

3. The apparatus of claim 1, wherein the sequencing batch biofilm reactor discharges the entire amount of the sewage and/or wastewater flowed in reactor to the anammox reaction tank when the ratio of ammonia nitrogen and nitrite nitrogen in sewage and/or wastewater is adjusted to a preset ratio.

4. The apparatus of claim 1, wherein the sequencing batch biofilm reactor contains a media for oxidizing nitrogen components by being moved, or fixed depending on an inflow of sewage and/or wastewater or supernatant liquid into the sequencing batch biofilm reactor.

5. The apparatus of claim 4, wherein the media is a moving media that is up and down depending on the inflow of sewage and/or wastewater or supernatant liquid, a packed-type media immersed in the lower part of the sequencing batch biofilm reactor, or a fixed-type fibrous media having a space for air supply in the middle of the fixed-type fibrous media.

6. The apparatus of claim 5, wherein the media is implemented with polypropylene (PP), polyethylene (PE), polystyrene (PS), or hydrogel in a case of the moving media, ceramic or clay in the case of the packed-type media, and polypropylene (PP), polyethylene (PE), polystyrene (PS), polytetrafluoroethylene (PTFE), or polyvinylidene fluoride or polyvinylidene difluoride (PVDF) in the case of the fixed-type fibrous media.

7. The apparatus of claim 1, wherein the sequencing batch biofilm reactor comprises an ammonia nitrogen sensor for sensing the concentration of ammonia nitrogen in the sequencing batch biofilm reactor.

8. The apparatus of claim 1, wherein the sequencing batch biofilm reactor comprises a nitrate nitrogen sensor for sensing the concentration of nitrate nitrogen in the sequencing batch biofilm reactor.

9. The apparatus of claim 1, wherein the sequencing batch biofilm reactor comprises a pH sensor for sensing the pH in the sequencing batch biofilm reactor.

10. The apparatus of claim 1, wherein the sequencing batch biofilm reactor comprises a dissolved oxygen sensor for sensing the amount of dissolved oxygen in the sequencing batch biofilm reactor.

11. The apparatus of claim 1, wherein the sequencing batch biofilm reactor comprises an outlet which allows the sewage and/or wastewater or supernatant liquid flowed into the inside of the sequencing batch biofilm reactor to be discharged to the outside thereof.

12. The apparatus of claim 11, wherein the outlet comprises a screen having holes smaller than the carrier and thus prevents discharge of the carrier.

13. The apparatus of claim 11, wherein the outlet is disposed in the lowest portion of the sequencing batch biofilm reactor.

* * * * *